Figure 5:
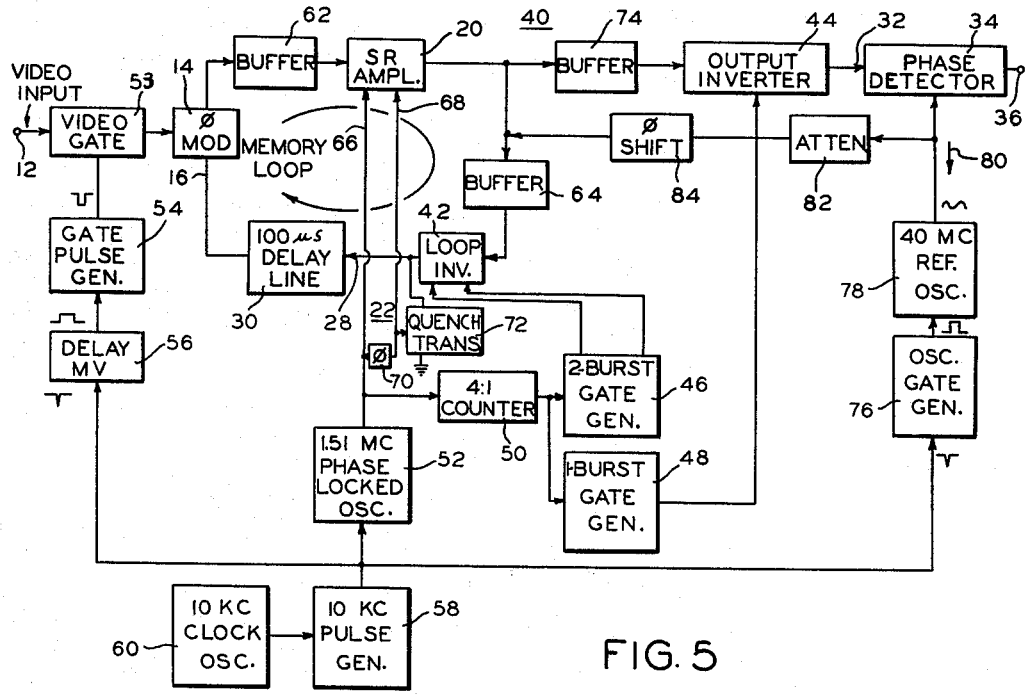

Sept. 1, 1964    W. G. EHRICH    3,147,444
SWEEP INTEGRATOR WITH PULSE INVERSION
Filed Oct. 7, 1959    5 Sheets-Sheet 1
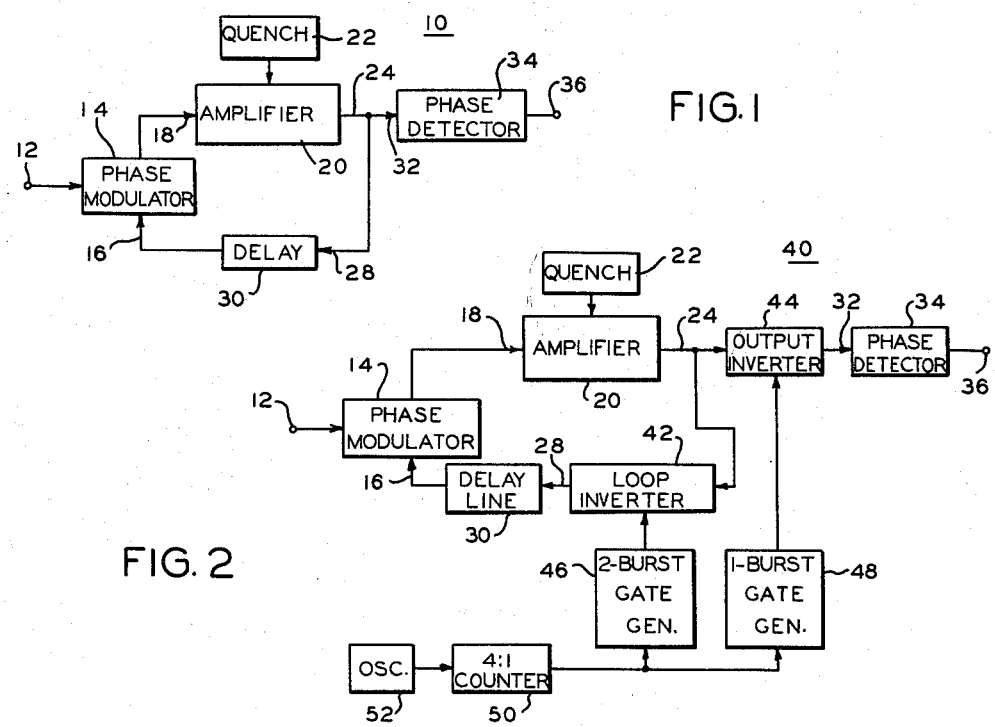
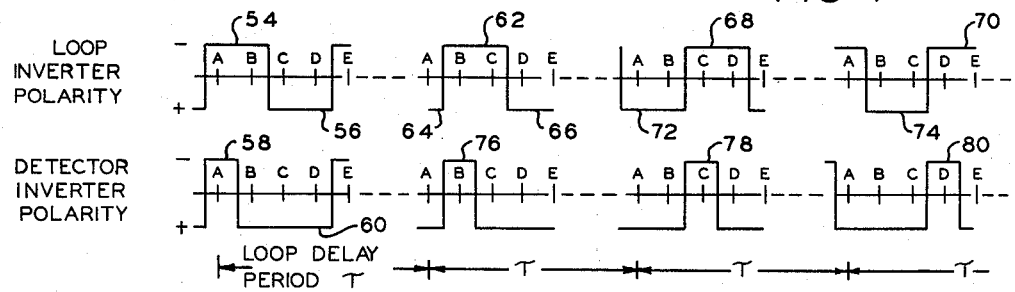
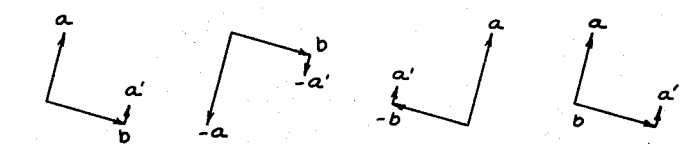
INVENTOR.
WILLIAM G. EHRICH
BY
Jacob Trachtman
ATTORNEY Sept. 1, 1964    W. G. EHRICH    3,147,444
SWEEP INTEGRATOR WITH PULSE INVERSION
Filed Oct. 7, 1959    5 Sheets-Sheet 2

INVENTOR.
WILLIAM G. EHRICH
BY
Jacob Trachtman
ATTORNEY

Sept. 1, 1964     W. G. EHRICH     3,147,444
SWEEP INTEGRATOR WITH PULSE INVERSION
Filed Oct. 7, 1959     5 Sheets-Sheet 3
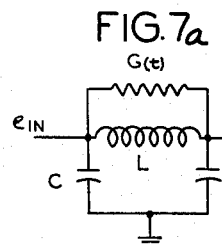
FIG. 7a
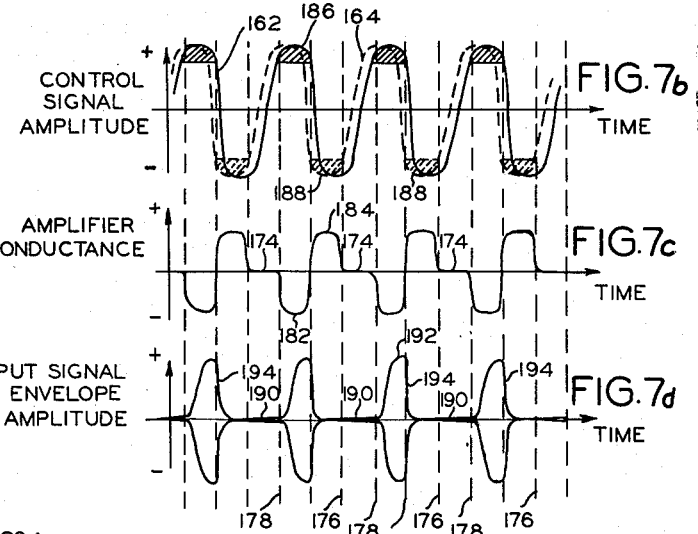
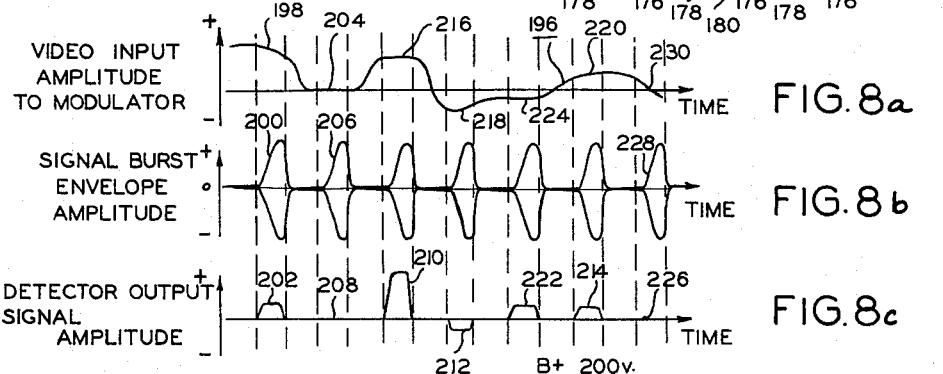
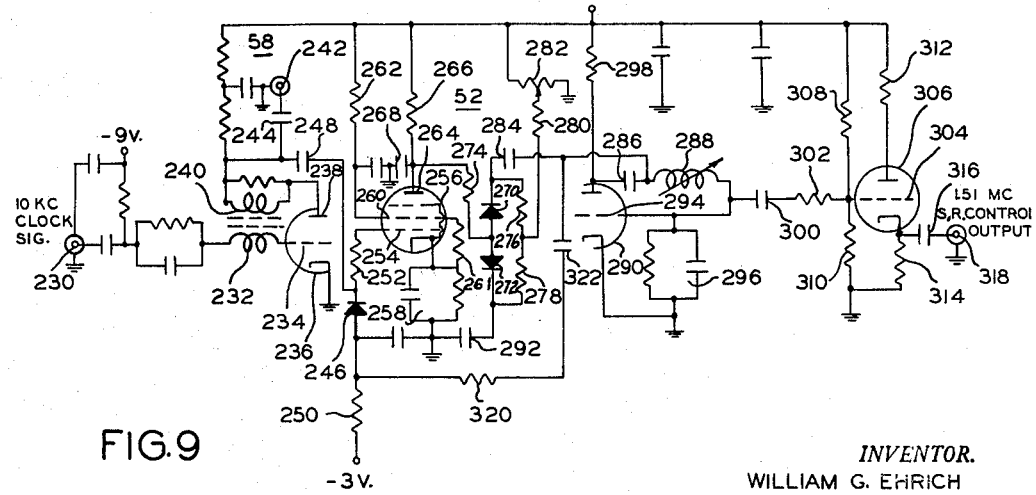
FIG. 9
INVENTOR.
WILLIAM G. EHRICH
BY Jacob Trachtman
ATTORNEY Sept. 1, 1964     W. G. EHRICH     3,147,444
SWEEP INTEGRATOR WITH PULSE INVERSION
Filed Oct. 7, 1959     5 Sheets-Sheet 4

*INVENTOR.*
WILLIAM G. EHRICH

BY *Jacob Trachtman*

ATTORNEY

Sept. 1, 1964 W. G. EHRICH 3,147,444
SWEEP INTEGRATOR WITH PULSE INVERSION
Filed Oct. 7, 1959 5 Sheets-Sheet 5

INVENTOR.
WILLIAM G. EHRICH
BY Jacob Trachtman
ATTORNEY

United States Patent Office 3,147,444
Patented Sept. 1, 1964

3,147,444
SWEEP INTEGRATOR WITH PULSE INVERSION
William G. Ehrich, Haddonfield, N.J., assignor to General Atronics Corporation, Bala-Cynwyd, Pa., a corporation of Pennsylvania
Filed Oct. 7, 1959, Ser. No. 844,971
29 Claims. (Cl. 328—121)

The invention relates to a signal combining circuit and method, and more particularly to a circuit and method for combining or integrating periodic signals received over a period of time, and which, for instance, is useful as a radar sweep integrator, a spectrum analyzer and also in any other system in which analogue signals are to be stored by recirculation.

Heretofore, circuits have been provided for combining and integrating information signals received over a period of time by modulating carrier signals and circulating such signals through a delay circuit. Such prior art circuits have been commonly known as comb filters and sweep integrators, and have the disadvantage that the stored signals disperse or shift with respect to each other causing cross-talk and contamination of the signals being stored or circulated. This limits a number of circulations of the stored information, since after a number of such recirculations the signal becomes highly contaminated resulting in the loss of the information being stored.

It is, therefore, a primary object of the invention to provide a new and improved signal combining circuit and method which minimizes signal distortion.

Another object of the invention is to provide a new and improved signal combining circuit and method which allows a great reduction in the number of components required for its operation.

Another object of the invention is to provide a new and improved signal combining circuit and method which minimizes amplifier distortion as a limitation to the memory of the apparatus.

Another object of the invention is to provide a new and improved signal combining circuit and method which eliminates spurious signals as a source of distortion by being sensitive only at predetermined times.

Another object of the invention is to provide a new and improved signal combining circuit and method with an information circulating means for yielding an information storage over a large number of circulations.

Another object of the invention is to provide a new and improved signal combining circuit and method which periodically reforms the circulating information signals for minimizing distortion.

Another object of the invention is to provide a new and improved signal combining circuit and method which periodically inverts certain of the circulating signals to cancel out and minimize signal distortion.

Another object of the invention is to provide a new and improved signal combining circuit and method for storing a large amount of information over an extended period of time with a minimum amount of distortion.

Another object of the invention is to provide a new and improved signal combining circuit which is highly reliable and efficient in operation, requires minimum maintenance, and may readily be fabricated.

The above objects as well as many other objects of the invention are achieved by providing a signal combining circuit comprising a signal modulating means for receiving an information signal to modulate a carrier signal, a signal connecting means providing a signal derived from the modulating means for delivery to the modulating means after a predetermined delay period, and amplifying means to amplify the modulated carrier signal derived from the modulating means. The circuit includes control means for periodically inhibiting the amplifier means to provide a plurality of discrete carrier signal bursts which are periodically modulated by the modulating means and circulated by the connecting means.

A signal inverting means is provided for sequentially inverting predetermined ones of the carrier signal bursts circulated by the connecting means while reinverting previously inverted carrier signal bursts for minimizing signal degradation.

Information signals circulating in the form of bursts are received by a detector for providing output information signals.

The method of the invention comprises the steps of producing a plurality of sequential carrier bursts with a predetermined carrier frequency, sequentially modulating said bursts with information derived from an information signal and periodically modulating respective modulated bursts with information periodically derived from the information signal. The method also encompasses the steps of providing at least one of the bursts as a reference burst, periodically modulating the reference burst by a reference signal to provide a carrier frequency reference phase, and combining a carrier signal having said reference phase with said bursts. The step of the method for detecting information of said bursts comprises comparing the respective phases of said bursts with said reference phase.

The method further provides for inverting selected ones of said carrier signal bursts for minimizing signal degradation.

The method of the invention for combining signals includes circulating a carrier signal in a circuit, modulating the carrier signal with an information signal, and periodically quenching the signal energy stored in said circuit to provide a plurality of independent discrete carrier signal bursts concurrently circulating in the circuit.

Figure 6:
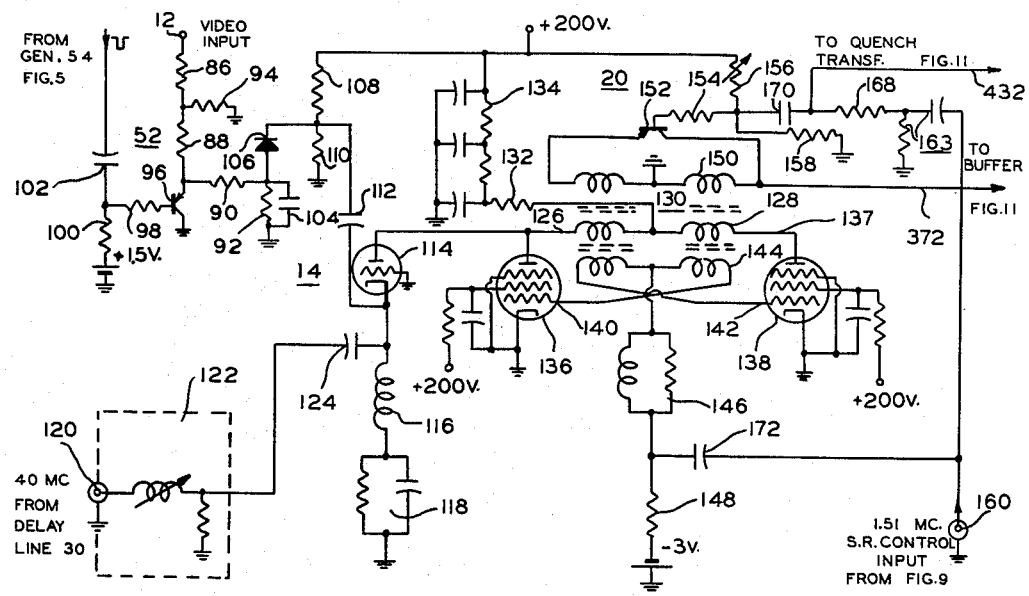
Figure 10:
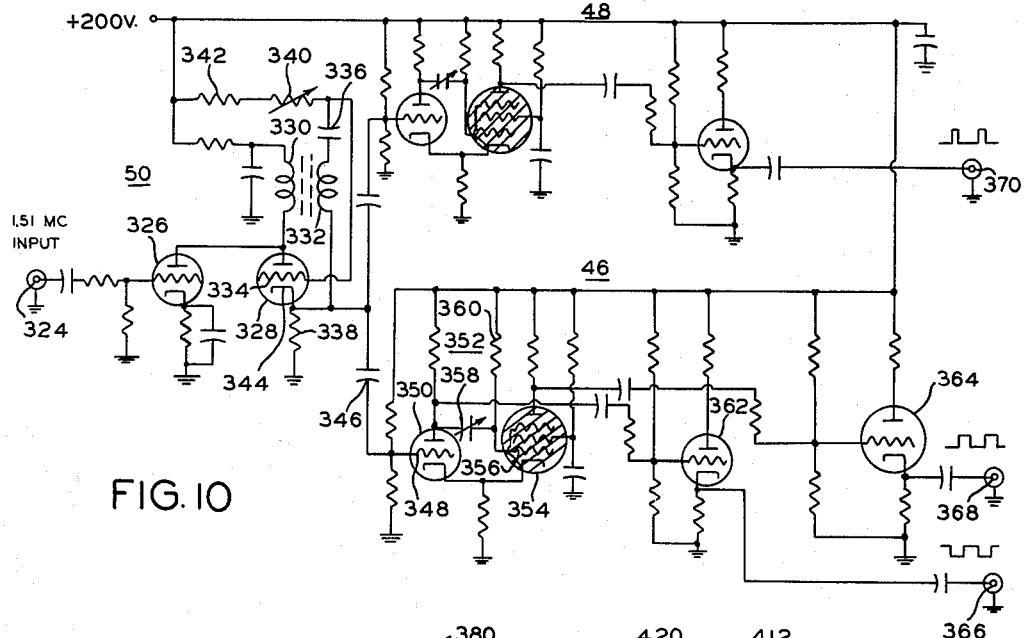
Figure 11:
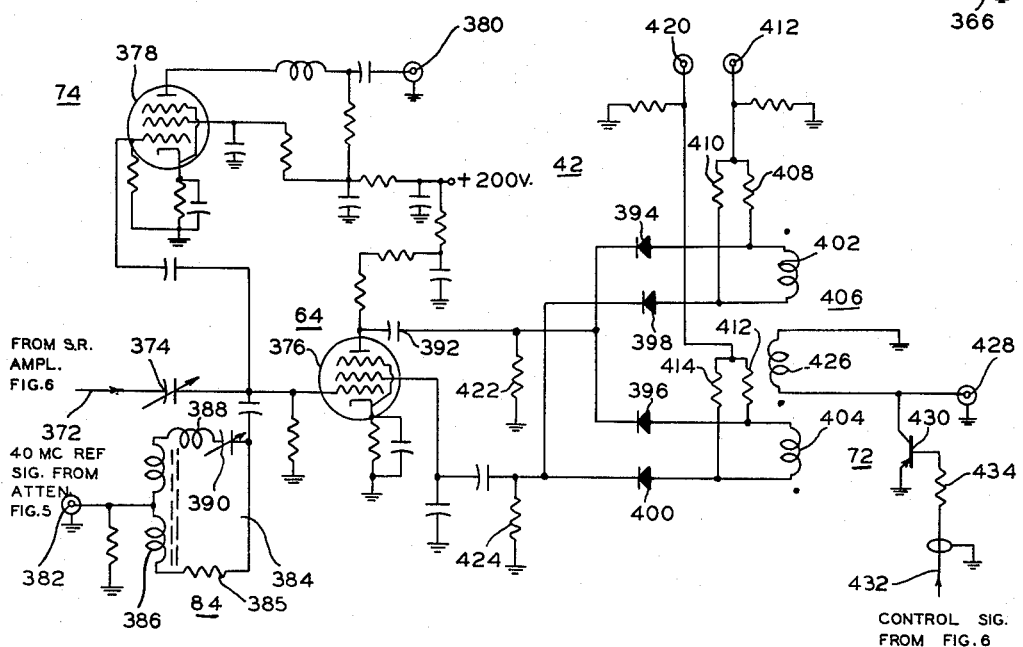
Figure 12:
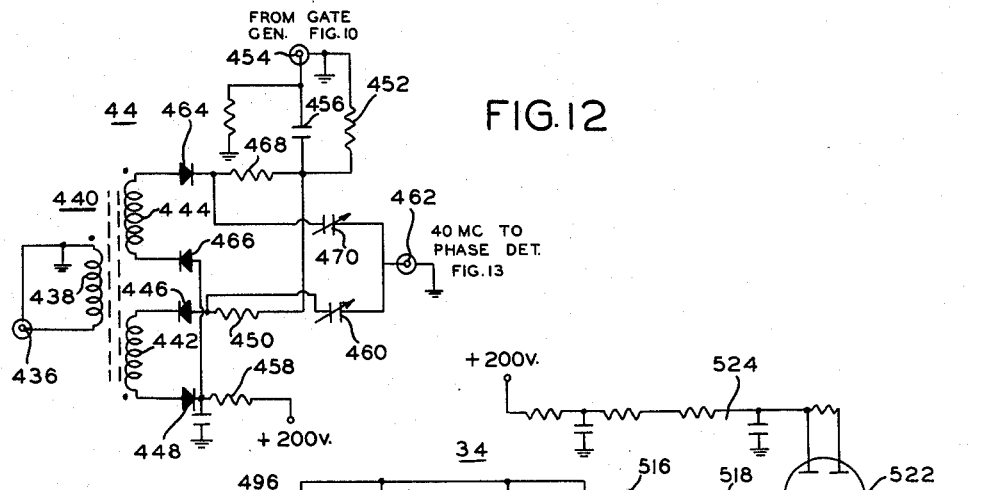
Figure 13:
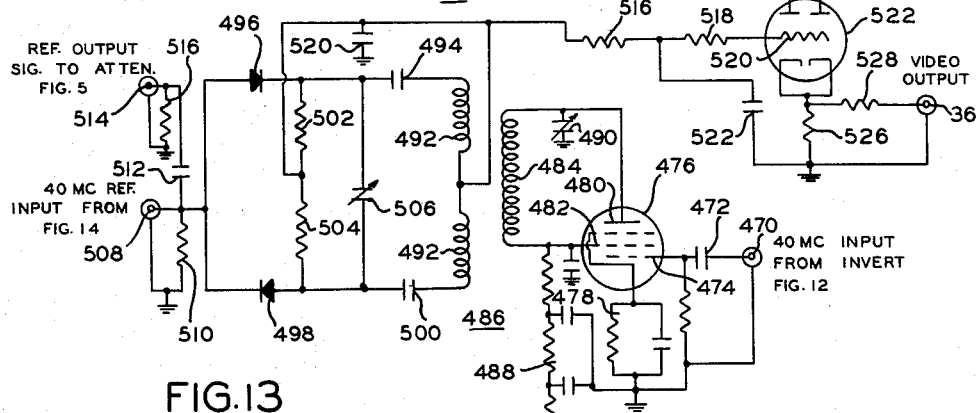
Figure 14:
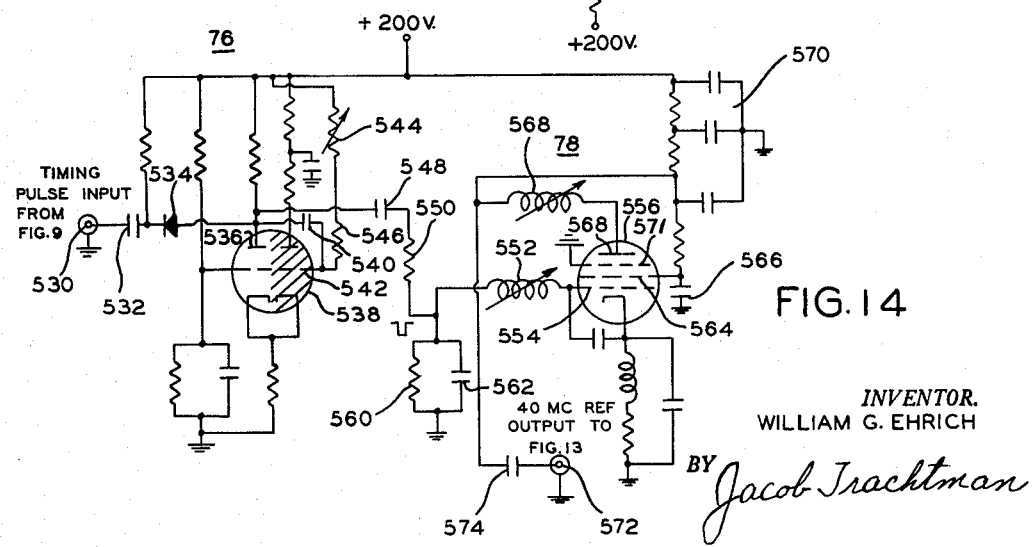

Other objects and advantages of the invention will become more apparent as the following detailed description of the invention is read in conjunction with the drawings, in which:

FIGURE 1 is a diagrammatic illustration in block form of a signal combining circuit embodying the invention, FIGURE 2 is a diagrammatic representation in block form showing the circuit of FIGURE 1 including signal inverting means, FIGURES 3a, 3b, 3c and 3d are diagrammatic representations in vector form of information signals circulating in the circuit of FIGURE 2, FIGURES 4a and 4b are diagrammatic representations of the signal voltages provided by the gate generators of FIGURE 2 for inverting information signals, FIGURE 5 is a diagrammatic representation in block form showing in greater detail the circuit of FIGURE 2, FIGURE 6 is a schematic diagram of the video gate, the modulator circuitry and superregenerative amplifier of FIGURE 5, FIGURE 7a is a schematic representation of an equivalent circuit for the superregenerative amplifier of FIGURE 5, FIGURES 7b, 7c and 7d are respective diagrammatic representations of amplifier control waves, amplifier conductance, and output signal envelope wave forms associated with the superregenerative amplifier, FIGURES 8a, 8b and 8c are respective diagrammatic representations of the wave forms of video information signals delivered to the circuit of FIGURE 5, the envelope of signal bursts circulated by the memory loop of the circuit, and output signals delivered by said circuit, FIGURE 9 is a schematic diagram of the pulse generator and phase locked oscillator in FIGURE 5, FIGURE 10 is a schematic diagram of the counter, and the burst gate generators of FIGURE 5, FIGURE 11 is a schematic diagram of the phase shifter, output and loop buffers, and memory loop inverter of FIGURE 5, FIGURE 12 is a schematic diagram of the output inverter of FIGURE 5, FIGURE 13 is a schematic diagram of the phase detector of FIGURE 5, and FIGURE 14 is a schematic diagram of the oscillator gate generator and reference oscillator of FIGURE 5.

Like reference numerals designate like parts through the several views and values of potential are given for purposes of illustration only and not in order to limit the scope of the invention.

Refer to FIGURE 1 which is a diagrammatic illustration in block form of a signal combining circuit 10 embodying the invention.

The circuit 10 has an input terminal 12 for receiving periodic information signals. The information signals are received by a phase modulator 14 which also receives circulating information signals from a line 16 and delivers output signals to the input 18 of a signal amplifier 20. The signal amplifier 20 also receives signals from a quenching means 22 for providing a plurality of independent output signal bursts at its output line 24. The signal bursts on the output line 24 are delivered to the input 28 of a delay element 30 for delivery to the input line 16 of the phase modulator 14 after a predetermined delay period.

The output signal on line 24 is also delivered to the input lead 32 of a phase detector 34 which delivers an information signal to the output terminal 36.

By the arrangement of circuit 10, signal bursts circulate in the memory loop comprising the amplifier 20, delay element 30 and phase modulator 14. When a burst is delivered to the phase modulator 14 from the element 30 it has its phase modulated by the information signal present on the input terminal 12. The output signal from the modulator 14 is amplified and reformed by the quenching operation for delivery to the delay element 30. After the predetermined delay period, the signal is again presented to the phase modulator 14 for being modulated again by the information signal present at that time at the input terminal 12. Thus after circulating a number of times the phase of a signal burst which corresponds to the stored information is the result of the periodic modulation by the input information signal at terminal 12.

The phase detector 34 which receives each of the signal bursts delivered by the amplifier 20 and circulated by the memory loop, detects the phase of the input signal for delivering an information output signal to its terminal 36. The information signals delivered at the output terminal 36 thus correspond to an integration or averaging of the input signals delivered to the input terminal 12 over a period of time. The delay period of the delay element 30 determines the signal period or interval for the signals on the input terminal 12 which are to be combined or averaged.

Refer now to FIGURE 2 which is a diagrammatic representation in block form showing a signal combining circuit 40.

The circuit 40 is identical to the circuit 10, except that it includes a signal inverting means. The signal inverting means provides a loop inverter 42 which receives signal bursts from the output line 24 of the amplifier 20 and delivers its output signals to the input 28 of the delay line 30. An output inverter 44 is also provided for receiving signals from the line 24 and delivering its output signals to the input 32 of the phase detector 34. The loop inverter 42 is conditioned for inverting input signals only when it receives a negative polarity signal from a 2-burst gate generator 46, while the output converter 44 is conditioned for inverting signals when it receives a negative polarity signal from a 1-burst gate generator 48. The gate generators 46, 48 receive timing signals from the output of a four to one counter 50 which is driven by an oscillator 52.

The FIGURE 4a shows the signals delivered by the gate generator 46 over several consecutive loop delay or circulation periods, while FIGURE 4b shows the corresponding signals provided by the gate generator 48. The signal from the gate generator 46 is negative at 54 during the first circulation period shown and has a duration of 2 bursts represented by the first and second burst positions A and B. The polarity of the signal then becomes positive at 56 for the next 2 burst positions C and D. Thus, the delivery of the negative polarity signal conditions the loop inverter 42 to deliver inverted burst signals at the input 28 of the delay line, while the next 2 bursts are not inverted due to the positive polarity of the generator signal at 56. This sequence is continued during the remainder of the loop delay period.

During the first loop delay period shown in FIGURE 4b, the gate generator 48 provides a signal with a negative polarity at 58 in the first burst position A and a positive polarity at 60 for the next 3 burst positions B, C and D. This sequence is repeated for each of the succeeding 4 burst positions during the first loop period.

In the succeeding loop delay period, the gate generator 46 provides a signal with a negative polarity at 62 during the interval including the second and third burst positions B and C, while providing a positive polarity signal during the first burst position 64 and the fourth burst position 66 of the sequence of four burst positions shown. This sequence is continued during the second delay period for all of the remaining burst positions. Thus, in a similar manner during the third and fourth loop delay periods, the negative portions of the signal are respectively shifted or precessed one burst position to the right respectively shown at 68 and 70 of FIGURE 4a. Correspondingly, the positive portions of the signal provided by the gate generator 46 are also respectively precessed as shown at 72 and 74.

The signal provided by the gate generator 48 and shown with a negative polarity at 58 during the first delay period is shifted or precessed one position to the right for each loop delay period so that it is at 76 during the second delay period extending over the burst position B and at 78 and 80 during next succeeding loop delay periods extending over the burst positions C and D.

The signal inverting means is provided for minimizing distortion and degradation of signals due to reflection and smearing or shifting of the information signals circulating in the memory loop of the circuit 40 and other such effects due to coherent contamination. The particular inversion scheme illustrated inverts every fourth signal burst during a signal circulation while at the same time reinverting every signal burst which was inverted during the previous circulation.

Thus, for example, the signal generated by the gate generator 46 at 54 will reinvert the burst in position A and invert the signal burst at position B, the signal burst in position A having been inverted during the previous loop delay period. The signal from the gate generator 48 occurs during the burst period A for reinverting the signal which had been inverted and thereby delivers output signals to the phase detector 32 none of which are inverted.

During the succeeding interval, the gate generator 46 at 62 (FIGURE 4a) causes the inverter 42 to reinvert the burst in position B, while inverting the succeeding burst in position C. Similarly, the gate generator 48 provides the negative polarity signal at 76 (FIGURE 4b) for inverting the burst signal at position B for delivery to the phase detector 32. This process continues from one circulation period to the next so that the previously inverted signal circulating in the loop is reinverted and the next occurring signal is inverted.

The manner in which the inversion of every fourth burst results in the elimination and minimization of distortion such as that due to cross-talk can be seen by means of the vector diagrams shown in FIGURE 3.

The information signals are represented for convenience by vectors $a$ and $b$ of equal length and shown at right angles or quadrature representing the amplitude and phase of two adjacent signals under consideration. The illustrations show the effect of the signal $a$ on signal $b$ in connection with the fourth burst inversion scheme.

In FIGURE 3a the component $a'$ of signal $a$ is spuriously added to signal $b$ distorting its phase during the first circulation. FIGURE 3b shows the inversion during the second circulation of signal $a$ which results in the addition of the spurious negative component $-a'$ to signal $b$ counteracting the effect of the signal $a'$ added during the previous circulation. In FIGURE 3c the signal $a$ is re-inverted and signal $b$ is inverted and has added to it a component $a'$ due to the signal $a$ increasing the phase of signal $b$, while in the succeeding circulation the signal $b$ is reinverted and has added to it the component $a'$ which now operates to decrease the phase of signal $b$ to its original value. Thus, the effect of signal $a$ on $b$ is cancelled every four circulations.

Thus, the effects of the burst in position B on the burst in position A, and burst in position A on bursts in positions C or D are cancelled in the same way. However, the effect of the burst in position A on the fourth burst positions E, I, M, etc., after the position A, are not cancelled because the bursts in those positions are also inverted during the same circulation period with the burst in position A. The scheme, therefore, does not operate to minimize contamination between the bursts spaced four positions from each other, that is the fourth, eighth, twelfth, etc., positions from the bursts providing the contaminating signal. However, such contamination which might result from spurious echoes in the delay line may be minimized by the type of delay elements and such other means utilized in the signal combining circuit 40.

Although the fourth pulse inversion scheme has been illustrated in detail, other inversion schemes may be utilized for the same purpose, operating in a similar manner to provide similar results.

FIGURE 5 is a block diagram showing in greater detail the circuit of FIGURE 2.

The modulator 14 receives video or information signals from the input terminal 12 through a video gate 53, which in its normal state conducts signals. The gate 53 is inhibited by a pulse signal from a gate pulse generator 54 which is timed by a signal from a delay multi-vibrator 56. Multi-vibrator 56, in turn, is triggered by pulses from a 10 kilocycle per second pulse generator 58 which is driven by a 10 kilocycle clock oscillator 60.

Upon receiving a trigger pulse, the delay multi-vibrator 56 generates a pulse having a duration which may be adjusted. Upon the termination of the pulse from the multi-vibrator 56, the pulse generator 54 is caused to provide an output pulse to the video gate 53 inhibiting the gate 53 and preventing the delivery of signals from the video input 12 to the phase modulator 14. The duration of the inhibiting pulse to the gate 53 is the same as the duration of each of the signal bursts circulating in the memory loop. The delay of the multi-vibrator 56 is adjusted so that the inhibiting signal to the video gate 53 occurs each time a burst in a selected position is delivered to the modulator 14 at its input line 16.

If, for example, the selected burst position is position A, then the phase of the burst in position A provides a reference phase corresponding to the delivery of a zero information signal.

The amplifier 20 of the memory loop is of the super-regenerative type and is provided with buffer amplifiers 62 and 64 to isolate it from the delay line 30. The amplifier 20 is turned on by a signal received over the line 66 from the oscillator 52 and receives a quenching signal on line 68 for turning the amplifier off. The signal on line 68 is also derived from the oscillator 52 through a phasing network 70. When the amplifier 20 is turned on it oscillates to provide a burst having a carrier frequency of 40 megacycles per second.

The oscillator 52 is the phase locked type receiving signals from the pulse generator 58 at the 10 kilocycle rate for providing an output signal in the form of a sine wave of 1.51 megacycles per second.

As will be described in detail below, each cycle of the signal from the oscillator 52 results in the generation of a burst signal by the amplifier 20. The input line 28 to the delay line 30 is periodically grounded by the quench transformer 72 which is also controlled by the signal on line 68 for assuring the absence of input signals during the quenching period between bursts. The delay line 30 which may be of the high quality ultra-sonic quartz type, provides a loop delay period of 100 micro-seconds. Since 1.51 million signal bursts per second are generated by the amplifier 20 and circulated in 100 micro-seconds, the multiplication of these factors, shows that 151 independent burst signals circulate in the memory loop providing 151 burst positions. Since the number of circulating bursts is modulo 4 minus 1, the inverting means precesses the inversion of signals by advancing one position for each circulation or loop delay period as described in connection with FIGURE 4.

In operation, the bursts are sequentially received by the phase modulator 14, which modulates the burst by shifting its phase according to the information signal present on the input terminal 12. The modulator 14 delivers the burst signal to the amplifier 20 just before the amplifier is turned on thereby causing the oscillations which occur when the amplifier is later caused to oscillate to have the same phase as the input burst signals. The amplifier 20, thereby, acts to reform the burst signals periodically having the information of the burst delivered at its input corresponding to the phase of the generated burst signal. As the series of bursts pass through the loop invertor 42, a previously inverted burst is reinverted while the next occurring burst is inverted to provide the fourth pulse inversion scheme. As the bursts continue to circulate, information is added periodically from the input signals 12 and integrated with the information circulating bursts and stored by the phase of burst carrier signal.

Since the amplifier 20 is turned off or non-responsive to input signals except when it is to receive the information from a signal burst at the time it is being delivered, any spurious information signals received before or after the time that it is sensitive to the incoming signal, is not amplified and therefore does not affect the phase of the output burst from the amplifier 20. Since the amplifier 20 is quenched at the end of each signal burst which it regenerates, all information stored in the amplifier 20 is removed, so that it has no effect on the next signal which is to be received by the amplifier, thereby minimizing contamination of the circulating information signals.

Signal bursts from the amplifier 20 are also delivered through an isolating amplifier or buffer 74 to the output signal inverter 44 for isolating the memory loop from the output circuitry.

The reference burst of zero information signal, previously mentioned, is provided, since a shift in the phase of the signal bursts may occur with and as a result of each circulation around the memory loop. The phase of the reference burst, therefore, may be used for comparison with the phases of the other 150 burst signals for determining an absolute value with respect to the reference burst.

This is achieved by providing an oscillator gate generator 76 which receives signals from the pulse generator 58 at a 10 kilocycle per second rate. At this rate, it is noted, one signal is delivered to the delay multi-vibrator 56 and the oscillator gate generator 76 for each period of 100 microseconds, which interval is also the memory loop delay period.

Upon receipt of the pulse, the generator 76 provides an output signal to a reference oscillator 78. The reference oscillator 78 oscillates with a frequency of 40 megacycles per second, except when it receives the output pulse signal from the generator 76. The gate generator 76 turns off the oscillator 78 during the times that the phase detector 34 receives the reference bursts regenerated by the amplifier 20 of the memory loop. At this time, due to leakage from the phase detector 34 as indicated by the arrow at 80, the circuit of the oscillator 78 which is tuned to the burst carrier frequency is set into oscillation with the phase of the reference burst. At the termination of the output signal from the generator 76, the reference oscillator 78 resumes oscillation and provides an output signal to the phase detector 34 having the same phase as that of the reference phase signal. Thus, with the delivery of each reference burst, to the detector 34, the oscillator 78 is turned off and then allowed to resume oscillation with the phase of the reference signal. In this manner, any phase shifts due to the circulation of the signal bursts are accommodated by resetting the phase of the reference oscillator 78 after every circulation.

As was previously noted, the delay of the multi-vibrator 56 is adjusted for providing a zero signal during the occurrence of the reference burst signal to modulator 14 and also for timing delivery of the inhibiting signal from the gate generator 76 to the reference oscillator 78 during the occurrence of the reference burst at the phase detector 34.

In order to guide and control the attenuation of the information signals circulating in the memory loop, signals from the reference oscillator 78 are also delivered through an amplitude attenuator 82 and a phase shift network 84 to the input of buffer 64. Since the reference oscillator 78 provides signals having the same carrier frequency of 40 megacycles per second as the signal bursts circulating in the memory loop, and has the phase corresponding to the reference burst, these bias signals will tend to change the phase of the information signals toward the zero reference value. The amount of such bias is controlled by adjusting the attenuator 82 for increasing or decreasing the amplitude of the signal delivered to the buffer 34. The phasing network 84 is provided for adjusting the phase shift in the zero reference signal for producing a zero output signal when a signal burst with a zero reference phase is delivered to the phase detector 34.

Thus, by providing a signal from the oscillator 78 which has a very small amplitude, information circulating in the memory loop will be lost at a very slow rate. However, if the signal amplitude is increased, the memory of the circulating loop will be decreased. The bias signal has the effect of returning the phase of the circulating information signals to the zero or reference value in the absence of coherent information input signals at the terminal 12 for particular burst positions.

It is noted that although the reference oscillator 78 provides continuous signals except during a short period of the cycle when it is turned off, the signal is not delivered to the input of delay line 26 between signal bursts from the amplifier 20 due to the grounding of the input line 28 by the quench transformer 72 between signal burst positions.

The FIGURE 6 is a schematic diagram of the video gate 52, the phase modulator 14, and the superregenerative amplifier 20 of FIGURE 5.

The video input terminal 12 is returned to ground potential through series resistor 86, 88, 90, and 92. The junction of resistors 86, 88 is connected to ground potential by a resistor 94, while the junction of resistors 88, 90 is connected to the emitter of a transistor 96 of the video gate 53.

The transistor 96 is of the PNP type and has its collector returned to ground potential. The base electrode of transistor 96 is returned to a positive potential of 1.5 volts through series resistors 98 and 100 for maintaining the transistor 96 normally non-conducting. The junction of resistors 98, 100 is connected to a capacitor 102 which receives and transmits the negative pulses from the gate generator 54 of FIGURE 5. The delivery of a negative signal from generator 54 renders the transistor 96 conductive and returns the junction of resistors 88, 90 to substantially ground potential. Thus, during delivery of a negative going signal from the pulse generator 54, the signal delivered to the input terminal 12 is prevented from being impressed across resistors 90 and 92 for delivery to the phase modulator 14.

The resistor 92 is connected in parallel with a capacitor 104 which by-passes the radio frequency carrier signals of the bursts, which in this case has the frequency of 40 megacycles per second, but provides a high impedance for the video signals which are impressed across the resistor 92 in the absence of a negative gating signal to the video gate 53.

A voltage sensitive crystal diode 106 is back biased by having its anode connected to the junction of resistors 90, 92 and its cathode connected to the junction of resistors 108, 110 which are bridged between a positive potential of 200 volts and ground potential.

The cathode of diode 106 is also connected by a series coupling capacitor 112 to the cathode of the triode valve 114 of the modulator 14. The cathode of valve 114 is returned to ground potential through an inductance coil 116 and a parallel resistor capacitor network 118. The coil 116 provides a high impedance for the carrier frequency of 40 megacycles per second, while the capacitor of network 118 by-passes the carrier frequency signal and provides a direct current voltage drop to provide bias voltage to the cathode of valve 114.

Signals from the output of the delay line 30 are received at the input terminals 120 of an impedance matching network 122 for delivery by a coupling capacitor 124 to the cathode of valve 114.

The control electrode of valve 114 is returned to ground potential, while the anode is connected to the end 126 of a center tapped plate winding 128 of a three winding transformer 130. The center tap of winding 128 is connected to a load resistor 132 which is returned to the positive potential of 200 volts through a filter network 134.

In operation, a signal burst having a carrier frequency of 40 megacycles is received by the terminal 120 and impressed across the cathode load of tube 114 through coupling capacitor 124. The video input signal delivered to terminal 12 for modulating the phase of the signal burst received at terminal 120 is impressed across resistor 92 for varying the back voltage of the crystal diode 106. As is well known in the art, the variation in the back voltage applied to diode 106 varies its capacitance, thereby, varying the capacitive reactance of the cathode load and accordingly shifting the phase of the carrier frequency signal or burst impressed across the cathode load of the modulator valve 114.

For example, in the apparatus described a maximum phase modulation on the order of two milliradians has been attained which is adequate for large numbers of circulations of the signal bursts, since the output signal obtained is the integrated effect of the input phase modulation over the memory time of the circulating loop.

The output signal from the modulator 114 is impressed upon the plate winding 128 of the transformer 130.

The end 126 of the winding 128 is connected with the anode of the pentode valve 136 of the superregenerative amplifier 20, while the opposite end 137 is joined with the anode of the pentode valve 138 for forming a push pull circuit. The control electrodes 140, 142 of valves 136, 138 are cross-coupled with the plate winding 128 by connecting with the two opposite ends of the center tapped grid winding 144 of the transformer 130.

The center tap of the grid winding 144 is connected to a negative bias potential of 3 volts through a parallel inductor resistor network 146 in series with a load resistor 148. The network 146 acts as a high impedance to the carrier frequency signal of the bursts to prevent its grounding, while passing video signals.

The third control load winding 150 of transformer 130 has its center tap grounded and its ends respectively connected with the emitter and collector of a normally off PNP type transistor 152. The base electrode of transistor 152 is connected by a resistor 154 to the junction of series resistors 156, 158 which are bridged between a positive potential of 200 volts and ground potential. The resistor 156 may have its resistance variable to adjust the positive signal on the base electrode of transistor 152 for normally maintaining it in its non-conducting state. When the transistor 152 is non-conducting, it effectively provides a high impedance load across the winding 150, while when it is conducting it provides a low impedance load.

A control signal 162 of sinusoidal form having a frequency of 1.51 megacycles per second is delivered to the terminal 160 from the phase locked oscillator 52. A signal amplitude is shown by the solid line in FIGURE 7b. The signal 162 is shifted by the capacitor-resistor network 163 to provide the signal 164 which leads by about 60° the input signal 162 at terminal 160. This signal 164 is shown by the dashed lines of FIGURE 7b. The signals 164 are delivered through series resistor 168, capacitor 170 and resistor 154 to the base electrode of the transistor 152.

The signal 162 of FIGURE 7b is also delivered from terminal 160 by a coupling capacitor 172 to the junction of the network 146 and resistor 148.

The superregenerative amplifier 20 is actuated by the control signal 162 delivered to terminal 160 to produce 151 million signal bursts per second corresponding to the frequency of the control signal. Each signal burst is thus produced within a period of ⅔ microsecond. Each burst period is divided into three intervals, the first being the zero conductance interval, the second is the negative conductance interval, and the third is the positive conductance interval.

The amplifier 20 may be represented by the equivalent circuit shown in FIGURE 7a comprising a tuned network or tank having an inductor L and two capacitors C bridging respective ends of the inductor L to ground potential, and a variable conductance G shunting the inductor L and connected between the voltage input and output leads.

The first interval of zero conductance is shown by line 74 of FIGURE 7c and occurs when the signal at 164 of FIGURE 7b has become sufficiently less negative to allow the transistor 152 to resume its non-conductive state, and when the signal 162 is sufficiently negative to cut off valves 136, 138, which time is indicated by the vertical dashed lines 176 of FIGURE 7. The zero conductance period extends until the time when the control signal 162 becomes sufficiently positive to provide a signal to the control electrodes 140, 142 of the valves 136, 138 of amplifier 20 to render them conductive. This begins the negative conductance interval at the time indicated by the vertical dashed lines at 178.

The negative conductance period extends until the time indicated by the dashed lines at 180 when the control signal 162 decreases sufficiently to render the valves 136, 138 non-conductive, and the signal 164 at the same time is sufficiently negative to cause the transistor 152 to conduct.

It is noted that the intervals of negative conductance at 182 of FIGURE 7c and the intervals of negative conductance at 184 coincide with the times of conduction respectively of the valves 136, 138 indicated by the shaded region at 186 and the times of conduction of the transistor 152 indicated by the dashed region at 188. It is also noted that these transitions are carried out easily and smoothly by utilizing sine waves for control signals. This means of control is of great advantage for minimizing the distortion and other undesirable characteristics of prior art devices.

In operation, a signal burst on input terminal 120 is modulated by the modulator 14 and delivered to the amplifier 20 during its zero conductance interval, that is, when the amplified valves 136, 138 and transistor 152 are non-conducting. Under these conditions of zero conductance, the 40 megacycle carrier signal builds up in the amplifier 20 illustrated by the equivalent resonant circuit shown in FIGURE 7a. The build up of the signal in the resonant circuit of the amplifier 20 which is substantially linear is shown at 190 of FIGURE 7d and is determined by the input signal to the amplifier having the phase of the signal burst delivered.

During the negative conductance period, the amplitude of the radio frequency or carrier signal increases exponentially to its saturation value shown at 192.

During the positive conductance period which follows, the amplifier valves 136, 138 are turned off preventing any further amplification of signals, while a low impedance load is effectively connected across the resonant circuit by the conductance of the transistor 152. This rapidly dissipates the stored energy in the tank circuit as indicated by the envelope of the signal burst at 194 of FIGURE 7d.

The three intervals complete the cycle for generation of a signal burst after which the amplifier 20 has all of its energy dissipated by being quenched in the manner described, so that it is again responsive to the signal and phase of an incoming burst signal during the next zero conductance interval.

The superregenerative amplifier which builds up the signal having the same phase in an exponential manner is highly effective in providing one stage of high amplification and a signal having the same maximum amplitude. The signals are all built up to the same amplitude due to the saturation effect of the regenerative amplifier. An advantage of this arrangement is also due to the insensitivity of the amplifier 20 during the positive and negative conductance intervals. Thus, the amplifier 20 is only sensitive to signal received during the zero conductance period at which time signals are expected, and is non-responsive to all signals thereafter received so that they do not affect the signal being produced. This minimizes distortion due to reflections from the delay line and other such effects.

FIGURE 8a illustrates the amplitude of a video information signal 196 which is delivered to the phase modulator 14 from the input terminal 12. The signal 196 may be a continuous slowly varying wave or a discontinuous signal such as derived by multiplexing techniques from a plurality of independent information signal channels. In the FIGURE 8b, signal bursts which have their phase modulated by the amplitude of the video signal are shown immediately below the appropriate portion of the video signal, while the output signal providing the information contained in the phase of the signal burst provided by the detector 34 to the output terminal 36 is shown in FIGURE 8c immediately below the corresponding signal burst of FIGURE 8b.

For example, the video signal at 198 modulates the burst at 200 occurring or being delivered to the modulator 14 during the time the video signal 198 is present. The burst 200 which is delivered by the modulator 14 to the amplifier 20, is reformed by the amplifier which provides an output signal having the same phase for recirculation in the loop and delivery to the detector 34. Corresponding to the phase of the burst 200, the detector 34 delivers an output signal indicated at 202 providing the information carried by burst 200.

At 204 the modulator 14 receives a zero video signal due to the delivery of a gating signal to the video gate 53 during the burst position in which the reference burst 206 occurs. The phase of the reference burst 206 corresponds to the zero value with which the reference oscillator 78 is cohered. Since the reference oscillator 78 is inhibited by a signal from the gate generator 76 during the delivery of the burst 206 to the phase detector 34, the absence of the reference oscillator signal 78 results in the delivery of the zero signal to the output terminal 36 shown at 208 of FIGURE 8c.

It is noted that amplitudes of the output signals from the detector 34 shown in FIGURE 8c do not necessarily have to correspond to the input amplitude of the video signal 196 of FIGURE 8a, since the output signal represents an average of many signals provided during a corresponding burst position over an extended period of time. Thus, although the output information signals at 210, 212 and 214 correspond to the respective senses of the video signals at 216, 218 and 220 of FIGURE 8a, the averaged output signal at 222 is positive while the input signal presented during the sampling period at 224 has a negative polarity.

It is also noted that a zero output signal is present at 226 in the pulse position during which the burst 228 occurs, which may be representative of noiselike or non-cohered input video signals occurring at 230 of FIGURE 8a, such noiselike or non-cohered signals being reduced to a zero signal by the feedback bias reference signal delivered through the attenuator 82 and phase shift network 84 to the circulating signal burst as explained in connected with FIGURE 5.

In the case where the video signal 196 is substantially constant or varies very slowly during the sampling interval extending over the time when signal burst is delivered to the modulator 14, the burst does not have its modulation varied as a function of time during its duration. This means that the phase of the carrier frequency is constant throughout the burst, and is precisely defined and has one value for each burst which is provided to the amplifier for amplification and regeneration.

In the case where the signal varies during the sampling period, the signal burst present also is modulated in a varying manner, and the phase of the signal burst is not constant throughout its duration. Upon the delivery of such a signal burst to the amplifier 20 during its zero conductance period, the resonant circuit of the amplifier 20 is caused to resonate with an average phase of the burst signals impressed. Upon the termination of the zero conductance interval, the average phase present at this time determines the phase of the burst signal generated by the amplifier 20. This is because the main portion of greatest amplitude of the signal burst is generated during the positive conductance interval beginning at 178 and extending to 180 of FIGURE 7d, during which the phase of the generated signal is constant and has the phase of the last signal present in the resonant tank circuit at the beginning of this stage representing an averaged phase.

Thus, the amplifier 20 acts to reform the signal bursts with a constant phase having an averaged value representing the average of many signals delivered over an extended period of time during the particular burst position, as well as the average of the variation of each of such signals during their sampling time. Since the phase of the output signals from the amplifier 20 is constant throughout the signal burst, the detector 34 provides a signal with substantially constant amplitude for representing the output information signal. Of course, the discrete output signals shown in FIGURE 8c and delivered to terminal 36 may be passed through an appropriate filter network to provide a continuous output information signal such as that illustrated in FIGURE 8a for the video input signal, but representing the averaged information signal values over an extended period of time with such output signal varying from cycle to cycle in accordance with the new information signals presented at the input terminal 12 and with the effect of the zero bias signal introduced into the signal circulating loop.

FIGURE 9 is a schematic diagram of the phase locked oscillator 52 and the pulse generator 58.

The input terminal 230 of the pulse generator 58 receives a 10 kilocycle per second signal from the clock oscillator 60 which is delivered to the control electrode 234 of the pulse generator valve 236 through appropriate coupling and biasing networks in series with the grid winding 232 of a coupling transformer. The valve 236 has its anode 238 returned to a positive potential of 200 volts by the resistance shunted plate winding 240 of said feedback transformer which is inductively coupled with the grid winding 232.

The pulse generator 58 has its control electrode 234 negatively biased for maintaining the valve 236 non-conductive. The valve 236 fires upon receiving a positive-going signal delivered on the input terminal 230 to provide a narrow pulse output signal. Such a circuit is commonly known as a blocking oscillator. Output signals from the pulse generator 58 are delivered to the output terminal 242 through a coupling capacitor 244 which is connected to the positive end of the plate winding 240.

The positive end of winding 240 is also coupled to the cathode of a crystal diode 246 by a signal storing capacitor 248. The anode of diode 246 is returned to a negative bias potential of 3 volts through a resistor 250, while the cathode of diode 246 is connected by a grid resistor 252 to the control electrode 254 of the control valve 256 of the phase locked oscillator 52.

The valve 256 has its cathode and suppressor electrode returned to ground through a parallel resistor capacitor network 258 while the screen electrode 260 is maintained at a positive potential by appropriate series resistors 262 and 261 and network 258 bridged between the positive potential of 200 volts and ground potential. The anode 264 of valve 256 is returned to a positive potential of 200 volts through a resistor 266, while the capacitor 268 is connected between the anode 264 and ground potential. The resistor 266 and capacitor 268 form a resistor capacitor network providing a predetermined time constant.

The potential at the anode 264 is also joined to the anodes of a pair of crystal diodes 270, 272 by a connecting resistor 274. The diodes 270, 272 have their cathodes connected together by series resistors 276 and 278 which have their junction returned to a positive potential through a resistor 280 connected to the contact arm of a potentiometer 282 having its resistance element connected between a positive potential of 200 volts and ground potential.

The cathode of diode 270 is also connected by a coupling capacitor 284 to the junction of capacitor 286 and variable inductor 288 of the oscillator valve 290 of the phase locked oscillator 52. The cathode of diode 272 is returned to ground potential through the capacitor 292.

The arrangement of the crystal diodes 270, 272 provides them with back voltages which may be adjusted by the potentiometer 282. By this mode of operation, the diodes 270, 272 each provide a capacitance which is variable with the potential applied to their anodes. In effect the variable capacitance provided by diodes 270, 272 are connected in series with capacitors 284 and 292 and contribute to the capacitive reactance of the tuned resonant circuit of the oscillator valve 290.

The oscillator valve 290 is a triode having its control electrode 294 returned to ground potential by a parallel resistor-capacitor network 296, while its cathode is grounded and its anode is returned through a load resistor 298 to a positive potential of 200 volts.

The signal delivered to the control electrode 294 of valve 290 is also fed by a coupling capacitor 300 and series resistor 302 to the control electrode 304 of a triode output valve 306. The control electrode 304 is properly biased by being connected to the junction of series resistors 308 and 310, while the anode is returned to a positive potential of 200 volts through an anode resistor 312. The cathode of the output valve 306 is returned to ground potential through a cathode load resistor 314 and is coupled by capacitor 316 to a signal output terminal 318 providing a signal of 1.51 megacycles per second. The terminal 318 is connected to the input terminal 160 of FIGURE 6 for providing the superregenerative control signal 162 shown as the solid line of FIGURE 7b.

In operation, the 10 kilocycle per second clock signals delivered to the input terminal 230 causes the pulse generator 58 to provide sharply spiked negative output signals at the same rate which are delivered through the signal storing capacitor 248 to the cathode of the crystal diode 246. The anode of the diode 246 also receives signals having a frequency of 1.51 megacycles by connection through resistor 320 and series coupling capacitor 322 to the junction of capacitor 286 and inductor 288 of the oscillator valve 290. The amount of current passed by the diode 246 upon the delivery of the negative spike signal to its cathode depends upon the phase of the 1.51 megacycle signal delivered to its anode. If the anode 246 becomes more positive, the current increases through the diode 246 resulting in a greater signal charge on the storage capacitor 248. Upon the termination of the negative pulse generated by the valve 236 and the return of its anode 238 to its positive potential of 200 volts at cut off, its positive signal impulse is delivered through the storage capacitor 248 to the control grid 254 of the control tube 256 for maintaining the control electrode 254 at a more positive level.

Conversely, if the phase of the signal delivered to the anode of diode 246 results in delivery of the negative spiked output signal from the generated valve 236 when the signal on the anode of diode 246 is less positive, this results in the passage of less current through the diode 246 resulting in the storage of a smaller charge on the capacitor 248. Upon the termination of the generated negative pulse by the valve 236 resulting in a positive going signal on the anode 238, a positive signal of smaller amplitude is delivered through the resistor 252 to the control electrode 254 of control valve 256. This results in a reduced conductance of valve 256 resulting in an increased potential at its anode 264.

The time constant provided by the combination of resistor 266 and capacitor 268 provides for delivery of an output signal potential which varies according to the phasing of the 10-kilocycles per second signal and the 1.51 megacycle per second signal delivered to the diode 246. As the positive signal at the anode 264 of control valve 256 increases, the anodes of diodes 270, 272 become more positive, reducing the back voltage applied to the diodes and thereby increasing their capacitance. The increased capacitance of the tuned resonant circuit of the oscillator 290, results in an increase in frequency.

Conversely, with the decrease in the voltage supplied to the anodes of crystal diodes 270, 272, the back bias voltage increases, resulting in a decrease in the capacitance of the resonant circuit of oscillator 290 and a decrease in its frequency.

Thus, consider a pulse at 10 kilocycles per second which occurs once for each 151 cycles for the 1.51 megacycles per second signal, and coincides with the negative slope of the sine wave signal of the oscillator valve 290.

An increase in the frequency of the oscillator signal results in a greater conduction by diode 246, while the decrease in its frequency results in a reduced conduction. As already noted, an increased conduction of diode 246 provides a decrease in voltage at the diodes 270, 272 increasing their capacity. This results in a decrease in the frequency of the oscillator 290.

Similarly, a decrease in conduction of diode 246 which occurs with a decreasing frequency of the oscillator valve 290 provides a feedback signal which increases the frequency of the oscillator 52. In this manner stability is provided, by having the input signal of 10 kilocycles per second lock-in and maintain the oscillator 52 tuned to provide an output signal with a precise frequency of 1.51 megacycles per second.

To accomplish this lock-in with the 151st harmonic of the 10 kilocycle per second signal, the potential provided to the cathodes of diodes 270, 272 is adjusted by varying the potentiometer 282 for tuning the frequency of the oscillator valve 290 and its circuit to the required frequency of 1.51 megacycles per second. After the oscillator is locked-in in this manner, it remains at the locked-in frequency, supplying the required control signal to the input terminal 160 of FIGURE 6.

FIGURE 10 is a schematic diagram of the counter 50, and the burst gate generators 46, 48 of FIGURE 5.

Input signals are delivered to the terminal 324 from the output terminal 318 of the 1.51 megacycles per second phase lock oscillator 52 of FIGURE 9. The signals are delivered to the control electrode of a triode trigger amplifier valve 326. The anode of valve 326 is joined with the anode of a blocking oscillator valve 328 and returned through the plate winding 330 of a blocking transformer to a positive potential of 200 volts.

The grid winding 332 of the blocking transformer has one end connected with the control electrode 334 of valve 328 through a capacitor 336, while its other end is joined to the cathode and returned to ground potential through the cathode output resistor 338. The control electrode 334 of valve 328 is also returned to the positive potential 200 volts through a variable resistor 340 in series with a resistor 342. The resistance of the resistor 340 is adjusted so that the resistance capacitance combination with capacitor 336 provides a negative blocking signal to the control electrode 334 of valve 328 allowing the delivery of one output signal at the cathode 334 of valve 328 for each fourth cycle of the signal delivered to the input terminal 324. In this manner, the circuit 50 provides a counting action and delivers a signal through coupling capacitor 346 to the control electrode 348 of a normally non-conducting triode valve 350 of a monostable multi-vibrator 352 of the two burst gate generator 46.

The mono-stable multi-vibrator 352 is of conventional design and has a normally conducting valve 354 which is cross coupled with the valve 350 in the usual manner.

When a positive going signal is delivered from the cathode 344 of the valve 328 to the control electrode 348 of valve 350, valve 350 becomes conductive and provides a signal to the control electrode 356 of valve 354 cutting it off. After a period of time determined by the time constant of the variable capacitor 358 and grid resistor 360, the valve 354 resumes conduction while the valve 350 is returned to its non-conductive state.

In the case of the two burst gate generator 46, the capacitor 358 is adjusted to cause the multi-vibrator 352 to return to its normal state after two cycles of the 1.51 megacycle per second signal and remain in its normal state for two cycles before it is triggered to its non-stable state.

The signals provided at the anodes of valves 350 and 354 are delivered to respective cathode follower valves 362, 364 for delivery by coupling capacitors to output terminals 366 and 368. It is noted that the signals delivered to output terminals 366 and 368 are identical square wave signals which are 180° out of phase with each other.

The one burst gate generator 48 is identical to the gate generator 46, except that the variable capacitor is adjusted to provide a pulse signal at its output terminal 370 which has a duration of 1 cycle of the 1.51 megacycle per second input signal to terminal 324. The burst generator 48 provides only one positive output pulse signal for each four cycles of the signal at terminal 324. The positive pulse provided coincides with the first half of the positive pulse delivered by the output terminal 368 of the two burst gate generator 46. Thus, the signals at output terminals 368 and 370 are respectively represented by the signal forms shown and illustrated in FIGURES 4a and 4b and are used in the fourth pulse inversion scheme illustrated in the present embodiment.

FIGURE 11 is a schematic diagram of the loop inverter 42, quenching transformer 72, loop buffer 64, output buffer 74, and phase shifter 84 of FIGURE 5.

The 40 megacycle per second signal bursts which are derived from the third control load winding 150 of the amplifier 20 over the signal output line 372 (see FIGURE 6) are delivered through a variable capacitor 374 to the loop buffer 64 and output buffer 74. The buffers 64 and 74 are of standard design, respectively comprising valves 376 and 378, with the output signal of valve 378 being delivered to an output terminal 380 for delivery to the output inverter 44 of FIGURE 12.

The 40 megacycle per second zero reference signal provided by the reference oscillator 78 through attenuator 82 is also delivered to the input terminal 382 of FIGURE 11. The reference signal on terminal 382 passes through a phase shift network 384 including a resistor 385 shunting a center tapped self-coupled winding 386, inductor 388 and variable capacitor 390 for providing an adjustable phase shift for the input signal. The network 384 is capacitively connected with the control electrodes of the valves 376 and 378 for combining zero reference signals with the superregenerative signal bursts for biasing the phase of the product signals toward the zero reference phase as explained above in connection with FIGURE 5.

The output signal derived from the anode of valve 376 is delivered through a coupling capacitor 392 to the cathodes of crystal diodes 394, 396 of the loop inverter 42. The anodes of crystal diodes 394, 396 are connected to the anodes of crystal diodes 398, 400 through respective primary windings 402, 404 of an output transformer 406. The anodes of diodes 394, 398 are also joined by respective resistors 408, 410 to a signal input terminal 412, while the anodes of diodes 396, 400 are linked by respective resistors 414, 416 with the input terminal 420. The cathodes of diodes 394, 396 are returned to ground by resistor 422 while the cathode of diodes 398, 400 are returned to ground potential by resistor 424.

The output winding 426 of the transformer 406 has one end returned to ground potential and the other end connected to the output terminal 428 such that signals on the input winding 404 are inverted at the output terminal 428, while signals on the input winding 402 are delivered without inversion of polarity to the terminal 428.

The terminal 428 is also connected with the collector of a damping transistor 430 which has its emitter returned to ground potential. The transistor 430 is of the PNP type which is maintained in its normal conductive state by receiving a positive signal at its base electrode. The base electrode of transistor 430 is connected by a resistor 434 to a shielded line 432 for deriving the control signal from the shielded line 432 shown in FIGURE 6. The control signal on line 432 is the sine wave signal 164 illustrated by the dashed lines of FIGURE 7b. When the signal 164 goes sufficiently negative as shown at regions 188 of FIGURE 7b, the transistor 430 becomes conductive dissipating the energy in the transformer 406, quenching same and maintaining the output signal at the terminal 428 at zero or ground potential. Thus, the transformer 406 of the loop inverter 42 is quenched between signal bursts as is the superregenerative amplifier 20, assuring the elimination and minimization of contaminating signals which might occur between signal bursts, and preventing the delivery of input signals to the delay line 30.

The two burst gate generator signals from terminals 366 and 368 of FIGURE 10 are respectively delivered to the input terminals 412 and 420 of the loop inverter 42. It is noted that the signals delivered to terminals 412 and 420 are 180° out of phase. Thus, when a positive signal is delivered to terminal 412 and a negative signal is delivered to terminal 420, the diodes 394 and 398 are rendered conductive, while the diodes 396 and 400 are non-conductive. Conversely, when the signal potentials on the input terminals are reversed, the diodes 394, 398 become non-conductive while the diodes 396, 400 conduct.

Thus, in the first situation where a positive signal is delivered to the terminal 412, the signal output from the buffer 376 will be delivered across the primary winding 402 and delivered to the output terminal 428 with the same polarity. Since the loop buffer 376 inverts the signal presented to the input line 372, this results in an output signal on terminal 428 having its phase inverted with respect to the phase of the input signal to line 372.

When during the next two burst periods a positive signal is delivered to the input terminal 420, the energization of the input winding 404 of the transformer 406 inverts the signal delivered to the output terminal 428, so that the total of the two inversions results in an output signal on terminal 428 having the same phase as the input signal on line 372.

By this mode of operation, two signal bursts delivered to line 372 are inverted, while the next two signal bursts are not inverted. This is in accordance with the inversion scheme illustrated in connection with FIGURE 4a.

FIGURE 12 is a schematic diagram of the output inverter 44 of FIGURE 5.

The input terminal 436 receives output signals from the output terminal 380 of the output buffer 74 of FIGURE 11. The terminal 436, which receives the 40 megacycle signal bursts, is connected to one end of the primary winding 438 of a transformer 440 which has its other end connected to ground potential. The primary winding 438 is inductively coupled with the secondary winding 442 for providing an output signal of the same phase, while the output winding 444 of the transformer 440 provides a signal of opposite phase at the output terminal 462. The upper end of the winding 442 is connected to the cathode of a crystal diode 446 while the lower end of the winding 442 is connected to the anode of the crystal diode 448. The anode of diode 446 is joined to ground potential through series resistors 450, 452 and linked to the input terminal 454 through resistor 450 in series with capacitor 456. The cathode of diode is 448 returned to a positive potential of 200 volts through a resistor 458, while the anode of diode 446 is connected through a variable capacitor 460 to an output terminal 462.

The upper end of the secondary winding 444 is connected to the anode of diode 464, while its lower end joins with the cathode of a crystal diode 466. The cathode of diode 464 is returned through a resistor 468 in series with the capacitor 456 to the input terminal 454, and is also connected by a variable capacitor 470 to the output terminal 462, while the anode of diode 466 is returned through the resistor 458 to the positive potential of 200 volts.

In operation, with the delivery of a positive pulse at terminal 454 from terminal 370 of the one burst gate generator of FIGURE 10, the diodes 446, 448 are poled to become conductive while the diodes 464, 466 are non-conducting. The signals present upon the secondary winding 438 are delivered by the secondary winding 442 to the output terminal 462 in non-inverted phase. However, since the signals on input line 372 of FIGURE 11 have been inverted once by the buffer 378 the present action results in the delivery of an output signal to terminal 462 which is inverted or 180° out of phase with the signal presented on the input line 372 of the output buffer 74 of FIGURE 11.

When the positive pulse is absent from the input terminal 454 a negative going signal is impressed upon the diodes 446, 448 rendering them non-conductive, while the diodes 464, 466 conduct and deliver the input signal on winding 438 after inversion by winding 444 to the output terminal 464. Thus, the phase of the output signal on terminal 464, having suffered two inversions, has the same phase as the signal to the input line 372 of the output buffer 74 of FIGURE 11.

As explained previously in connection with FIGURES 2 and 5 as well as FIGURES 4a and 4b, this action accomplishes the reinversion of each fourth signal burst which has been inverted by the loop inverter 42, for presenting signal bursts none of which are inverted at the output terminal 462 of FIGURE 12.

FIGURE 13 is a schematic diagram of the phase detector 34 of FIGURE 5.

The input terminal 470 receives the signal bursts delivered by the output terminal 462 of the output inverter 44 shown schematically in FIGURE 12. The signals on terminal 470 are delivered through a coupling capacitor 472 to the control electrode 474 of the buffer amplifier valve 476 of the detector 34. The amplifier valve 476 includes a standard circuit arrangement having a parallel resistor-capacitor network 478 returning the cathode to ground potential for providing cathode biasing, while the anode 480 and screen electrode 482 are connected to opposite ends of the primary winding 484 of the detector transformer 486. The screen electrode 482 is returned to a positive potential of 200 volts through a carrier frequency filter network 488, while the variable capacitor 490 connected between the anode 480 and ground potential is tuned to resonate the primary winding 484 of the transformer 486 to a frequency of 40 megacycles per second.

The center-tapped secondary winding 492 of the transformer 486 has its upper end connected by a capacitor 494 with the cathode of a crystal diode 496, while its lower end is joined with the anode of a crystal diode 498 through a capacitor 500. The cathode of diode 496 and the anode of diode 498 are connected by a series resistors 502 and 504 which are shunted by a variable capacitor 506. The variable capacitor 506 is adjustable to tune the secondary winding 492 of the transformer 486 to a resonant frequency of 40 megacycles per second.

The anode of diode 496 and the cathode of diode 498 are joined to the input terminal 508 which receives 40 megacycles per second zero reference signals from the reference oscillator 78 of FIGURE 14. The terminal 508 is returned to ground potential through an input resistor 510 and is connected by capacitor 512 to the reference output terminal 514 which delivers reference signals to the signal attenuator 82 of FIGURE 5. The terminal 514 is also returned to ground potential through an output resistor 516.

The junction of resistors 502, 504 and the center tap of the secondary winding 492 of transformer 486 are joined together and connected by series resistors 516 and 518 to the control electrode 520 of a cathode follower output valve 522 of the detector 34. The junction of resistors 502, 509 and the center tap of winding 492 are also returned to ground potential through a capacitor 520 for bypassing carrier frequency signals of 40 megacycles, while the junction of resistors 516 and 518 is also returned to ground potential through the capacitor 522.

The anodes of valve 522 are connected to the positive potential of 200 volts through a 40 megacycle filter network 524 comprising resistors and capacitors for removing the carrier frequency signal, while the cathodes are linked together and returned by the cathode load resistor 526 to ground potential. The output signal from the valve 522 is delivered from the cathode through resistor 528 to the output video terminal 36.

In operation, upon receipt of a signal burst having the carrier frequency of 40 megacycles at the input terminal 470, the buffer amplifier valve 476 amplifies this signal and causes the resonant circuit of its anode including the primary winding 484 and capacitor 490 to resonate with a phase controlled by the incoming signal. The secondary winding 492 which is inductively coupled with the primary winding 484 of the transformer 486 induces oscillations in the secondary circuit which is also tuned to 40 megacycles and has the phase of the incoming signal at terminal 470.

Hence, signals are respectively delivered with opposite polarities to the cathode of diode 496 and the anode of diode 498 with the polarities being reversed every half cycle. The input signal to terminal 508 from the reference oscillator 78 is presented concurrently to the anode of diode 496 and cathode of diode 498 with its polarity changing every half cycle.

The amplitude of the input signal to terminal 508 is greater than the amplitude of the signal having the burst phase provided by the secondary winding 492. The signal burst, however, controls the conduction of the diodes 496, 498 according to their phase with respect to the reference signal presented to these diodes.

Thus, if a positive signal from the reference source terminal 508 is delivered to the anode of diode 496 in phase with the positive signal delivered to its cathode, the resulting conductions of diodes 496, 498 over a cycle develops a voltage which is negative with respect to ground at the junction of resistors 502, 504. Conversely, when the reference signal and the signal burst are in phase at the diode 498, a positive signal with respect to ground potential is developed at the junction of resistors 502, 504, while a zero potential signal is present at this juncture when the reference and signal bursts have their phases in quadrature, or 90° out of phase.

Since the 40 megacycle per second carrier frequency signal at the juncture of resistances 502, 504 is bypassed to ground potential by the capacitor 520, the video signal developed corresponding to the difference in phase between the information signal burst and the reference burst is delivered to the control electrode of valve 520 for amplification and delivery to the output terminal 36. The video information output signal in the presence of an input signal burst is shown by the representations of FIGURE 8c and may be positive or negative depending upon whether the phase of the information signal bursts leads or lags the reference signal about its quadrature point.

In order to get a zero amplitude output signal when the phase of the information signal corresponds to zero signal level, the phase shifter 84, in addition to being adjustable to compensate for phase shifts from the loop to the phase detector 34, also provides a 90° phase shift in the reference signal derived from terminal 514 of FIGURE 13 and added to the information signals circulating in the loop.

It is noted that this signal is not added to the zero reference signal circulating in the loop and periodically delivered to the phase detector 34 since when the superregenerative amplifier 20 provides the reference signal burst, an output pulse from the pulse generator 58 is delivered to the oscillator gate generator 76 inhibiting oscillations of the reference oscillator 78.

Thus, by addition of the biasing reference signal which is shifted by 90° with respect to the reference burst, the zero phase level towards which the information signals are biased by the added feedback reference signal is in quadrature with the phase of the circulating reference burst.

Of course, this additional 90° phase shift is provided because of the particular phase detector utilized and as will be apparent to those skilled in the art may not be necessary in another detecting process, or may be modified in accordance the requirements of any other circuit arrangements employed.

The FIGURE 14 is a schematic diagram of the oscillator gate generator 72, and the reference oscillator 78 of FIGURE 5.

The input terminal 530 of the gate generator 76 receives negative trigger pulses from the output terminal 242 of the pulse generator 58 schematically illustrated in FIGURE 9. The terminal 530 is connected by a capacitor 532 through a diode 534, poled to pass negative going signals to the anode 536 of a normally non-conducting portion of the valve 538 of a multi-vibrator of common design.

The anode 536 is connected by a capacitor 540 to the control electrode 542 of the normally conducting portion of the valve 538. Upon the delivery of a negative going signal to the terminal 530 which is passed by the diode 534 and the capacitor 540 to the control electrode 542, the normally conducting portion of the valve 538 becomes non-conducting, while the normally non-conducting portion begins to conduct. The variable resistor 544 which is connected in series with resistor 546 to the control electrode 542 of the valve 538 is adjusted to provide a time constant for developing a negative going square wave signal at the anode 536 at valve 538 of ⅔ microsecond upon the delivery of a negative timing pulse.

The negative going pulse developed at the anode 536 of the valve 538 of the multi-vibrator is delivered by a series coupling capacitor 548, resistor 550 and variable grid tank inductor 552 to the control electrode 554 of the valve 556 of an electron coupled oscillator of the Colpitts type comprising the reference oscillator 78. The delivery of the negative going pulse to the control electrode 554 cuts off the valve 556 and inhibits oscillations of the circuit.

The oscillator circuit is of standard design in which the grid resistor 560 returns the control electrode 554 to ground potential through the inductor 552 for providing direct current bias, while the capacitor 562 provides capacitance in series with the inductance of inductor 552 for resonating the grid circuit at the frequency of 40 megacycles per second. The screen electrode 564 is connetced to a positive potential of 200 volts through an appropriate RF decoupling network 570 and returned to ground potential through the capacitor 566, while the anode 568 is connected to the positive potential of 200 volts through a variable plate inductor 568, and the decoupling network 570. The screen electrode 571 is joined directly to ground potential. The output terminal 572 of the oscillator 78 is connected with the anode 568 of valve 556 through capacitor 574 and inductor 568, which is tuned to provide a 40 megacycle signal.

In operation, when a negative cut off pulse is supplied to the control electrode 554 of the valve 560, the oscillator 78 ceases to generate oscillations. At this time, the reference signal circulating in the memory loop and delivered by the superregenerative amplifier 20 is received by the phase detector 34 and leaks from the terminal 508 (FIGURE 13) to the terminal 572 of the oscillator 78 inducing a signal of the resonant frequency (40 megacycles per second) in the tank circuits of the oscillator 78 having the phase of the reference signal burst. These oscillatory signals with the reference phase build up sufficiently so that when the negative cut off pulse from the multi-vibrator valve 538 is removed, the oscillator 78 starts to oscillate at its resonant frequency of 40 megacycles per second with the phase of the signal impressed by the reference burst. The reference oscillator 78 contiues to oscillate at this frequency with the set reference phase during the remaining period of the loop circulation cycle, during which 150 reference signals are received by the detector. After this, the negative going signals are again impressed causing the oscillator to be turned off and to have induced the signal with the phase of the then current reference burst in its resonant circuit, for providing the proper reference phased signal for comparison with the next series of 150 bursts which will be delivered to the detector 34.

In summary, the invention provides for the circulation of signal bursts by controlling a superregenerative amplifier which is quenched at the termination of each burst to remove signals from its energy storing or resonant circuits. Other quenching circuits are also provided to assure the minimization of contamination by signals occurring between bursts. As the signals circulate in the memory loop they have their phase modulated by the video signal impressed at the input of the circuit 40, so that the phase of each signal burst is an integration of information signals delivered periodically over an extended period of time.

Provision is made for inverting certain of the circulating signals, such as the fourth burst, with the bursts which are inverted precessed with each circulation for the purpose of minimizing the burst contamination and other such coherent contaminating effects.

One of the signal bursts is provided as a reference burst for determining the zero reference phase for the circulating information signal bursts. The reference burst is impressed upon a reference oscillator at the beginning of each cycle to cohere the phase of the generated signal with the reference signal for taking into account any phase shifts due with the circulation of the signal bursts and establishing a reference zero value towards which the information signals are biased.

The phase detector delivers at its output terminal video signals having an amplitude which may be either positive or negative representing the information signals resulting from the integration of information signals presented to the circuit 40 over an extended period of time.

The circuit provides means for circulaating information signals over an extended period of time by minimizing contamination thereby allowing a longer memory, while still having all of the advantages of the prior art devices with highly superior results.

Although a specific embodiment of the present invention has been described and illustrated in detail, it is to be understood that the invention is capable of various modifications and applications not departing essentially from the spirit thereof which will become apparent to those skilled in the art.

I claim:

1. A signal combining and information storing circuit comprising a signal modulating means for receiving an information signal to modulate a carrier signal, a signal connecting means deriving a signal from said modulating means and subjecting said derived signal to a predetermined delay, and control means providing for the periodically intermittent delivery of carrier signals from said connecting means to said modulating means.

2. The circuit of claim 1 in which the period of said delivery is less than the delay period of said connecting means to provide a plurality of discrete carrier signal bursts which are periodically modulated by said modulating means and circulated by said connecting means.

3. The circuit of claim 2 including a detecting means for receiving carrier signals derived from said modulating means and delivering an output signal.

4. The circuit of claim 2 including signal inverting means for inverting in phased selected ones only of said carrier signal bursts for minimizing signal degradation.

5. The circuit of claim 4 including a detecting means for receiving carrier signals derived from said modulating means and delivering an output signal, and means for reinverting inverted carrier signals for delivery by said detecting means.

6. The circuit of claim 4 including signal inverting means for sequentially inverting each fourth carrier signal burst circulated by said connecting means while reinverting previously inverted carrier signal bursts for minimizing signal degradation.

7. The circuit of claim 6 in which the said control means provides a predetermined number of discrete carrier signal bursts for causing the precession of the signal bursts which are inverted by said inverting means with each circulation of said signal bursts.

8. The circuit of claim 7 including a detecting means for receiving carrier signals derived from said modulating means and delivering an output signal, and means for reinverting inverted carrier signals for delivery by said detecting means.

9. A signal combining and information storing circuit comprising a signal angular modulation means for receiving an information signal to modulate a carrier signal, a signal connecting means deriving a signal from said modulating means and subjecting said signal to a predetermined delay, and control means providing for the periodically intermittent delivery of carrier signals from said connecting means to said modulation means.

10. The circuit of claim 9 in which the period of said delivery is less than the delay period of said connecting means to provide a plurality of discrete carrier signal bursts which are periodically modulated by said modulating means and circulated by said connecting means.

11. The circuit of claim 10 including an angular detecting means for receiving signals derived from said modulating means and delivering an output signal.

12. The circuit of claim 10 including signal inverting means for inverting in phase selected ones only of said carrier signal bursts for minimizing signal degradation.

13. The circuit of claim 12 including an angular detecting means for receiving carrier signals derived from said modulating means and delivering an output signal, and means for reinverting inverted carrier signals for delivery by said detecting means.

14. The circuit of claim 12 including signal inverting means for sequentially inverting each fourth carrier signal burst circulated by said connecting means while reinverting previously inverted carrier signal bursts for minimizing signal degradation.

15. The circuit of claim 14 in which said control means provides a predetermined number of discrete carrier signal bursts for causing the precession of the signal bursts which are inverted by said inverting means with each circulation of said signal bursts.

16. The circuit of claim 15 including an angular detecting means for receiving carrier signals derived from said modulating means and delivering an output signal, and means for reinverting inverted carrier signals for delivery by said detecting means.

17. A signal combining an information storing circuit comprising a signal phase modulating means for receiving an information signal to modulate a carrier signal, a signal connecting means deriving a signal from said modulating means and subjecting said derived signal to a predetermined delay, and control means providing for the periodically intermittent delivery of carrier signals from said connecting means to said modulating means.

18. The circuit of claim 17 in which the period of said delivery is less than the delay period of said connecting means to provide a plurality of discrete carrier signal bursts which are periodically modulated by said modulating means and circulated by said connecting means.

19. The circuit of claim 18 including a phase detecting means for receiving signals derived from said modulating means and delivering an output signal.

20. The circuit of claim 19 including a phase reference means periodically cohered with a phase reference carrier burst circulated by said connecting means and providing a signal to said detecting means for producing the output signal of said detecting means.

21. The circuit of claim 18 including signal inverting means for inverting in phase selected ones only of said carrier signal bursts for minimizing signal degradation.

22. The circuit of claim 21 including a phase detecting means for receiving carrier signals derived from said modulating means and delivering an output signal, and means for reinverting inverted carrier signals for delivery by said detecting means.

23. The circuit of claim 21 including signal inverting means for sequentially inverting each fourth carrier signal burst circulated by said connecting means while reinverting previously inverted carrier bursts for minimizing signal degradation.

24. The circuit of claim 23 in which said control means provides a predetermined number of discrete carrier signal bursts for causing the precession of the signal bursts which are inverted by said inverting means with each circulation of said signal bursts.

25. The circuit of claim 24 including a phase detecting means for receiving carrier signals derived from said modulating means and delivering an output signal, and means for reinverting inverted carrier signals for delivery by said detecting means.

26. A signal combining circuit comprising a signal modulating means for receiving an information signal to modulate a carrier signal, a signal connecting means deriving a signal from said modulating means and subjecting said derived signal to a predetermined delay, amplifying means for amplifying said modulated carrier signal derived from said modulating means, and control means periodically quenching the circuit containing said amplifying means by dissipating signal energy stored therein to provide a plurality of periodic carrier signal bursts.

27. The circuit of claim 26 including control means for periodically inhibiting said amplifier means to provide a plurality of discrete carrier signal bursts which are periodically modulated by said modulating means and circulated by said connecting means.

28. The circuit of claim 27 in which said amplifier is a superregenerative amplifier for periodically oscillating at the carrier signal frequency responsive to said control means and in phase with a sensed input carrier signal.

29. The circuit of claim 28 in which said amplifier means has a tuned network which successively has zero, negative and positive conductance stages responsive to said control means, said network sensing a signal received by said amplifier means during the zero conductance stage, amplifying said sensed signal during the negative conductance stage, and quenching and inhibiting the delivery of an output signal during the positive conductance stage of said amplifier means, said amplifying means being insensitive to signals received during its negative and positive conductance stages.

References Cited in the file of this patent

UNITED STATES PATENTS

| | | |
|---|---|---|
| 2,551,348 | Sunstein | May 1, 1951 |
| 2,593,113 | Cutler | Apr. 15, 1952 |
| 2,689,269 | Bradley | Sept. 14, 1954 |
| 2,713,605 | Bradley | July 18, 1955 |
| 2,750,499 | Newman et al. | June 12, 1956 |
| 2,831,052 | Boothroyd | Apr. 15, 1958 |
| 2,841,704 | Sunstein et al. | July 1, 1958 |
| 2,871,349 | Shapiro | Jan. 27, 1959 |
| 2,897,490 | Sunstein | July 28, 1959 |
| 2,908,812 | Laurent | Oct. 13, 1959 |
| 2,928,047 | Littlefield | Mar. 8, 1960 |

UNITED STATES PATENT OFFICE
CERTIFICATE OF CORRECTION

Patent No. 3,147,444                         September 1, 1964

William G. Ehrich

It is hereby certified that error appears in the above numbered patent requiring correction and that the said Letters Patent should read as corrected below.

Column 3, line 9, for "through" read -- though --; column 7, line 65, for "resistor" read -- resistors --; column 10, line 3, for "amplified" read -- amplifier --; line 37, for "signal" read -- signals --; column 19, line 29, for "connetced" read -- connected --; column 20, line 22, for "circulaating" read -- circulating --; line 51, for "phased" read -- phase --; column 22, line 34, after "amplifier" insert -- means --; line 46, for "amplifying" read -- amplifier --.

Signed and sealed this 19th day of January 1965.

(SEAL)
Attest:

ERNEST W. SWIDER                        EDWARD J. BRENNER
Attesting Officer                     Commissioner of Patents